UNITED STATES PATENT OFFICE.

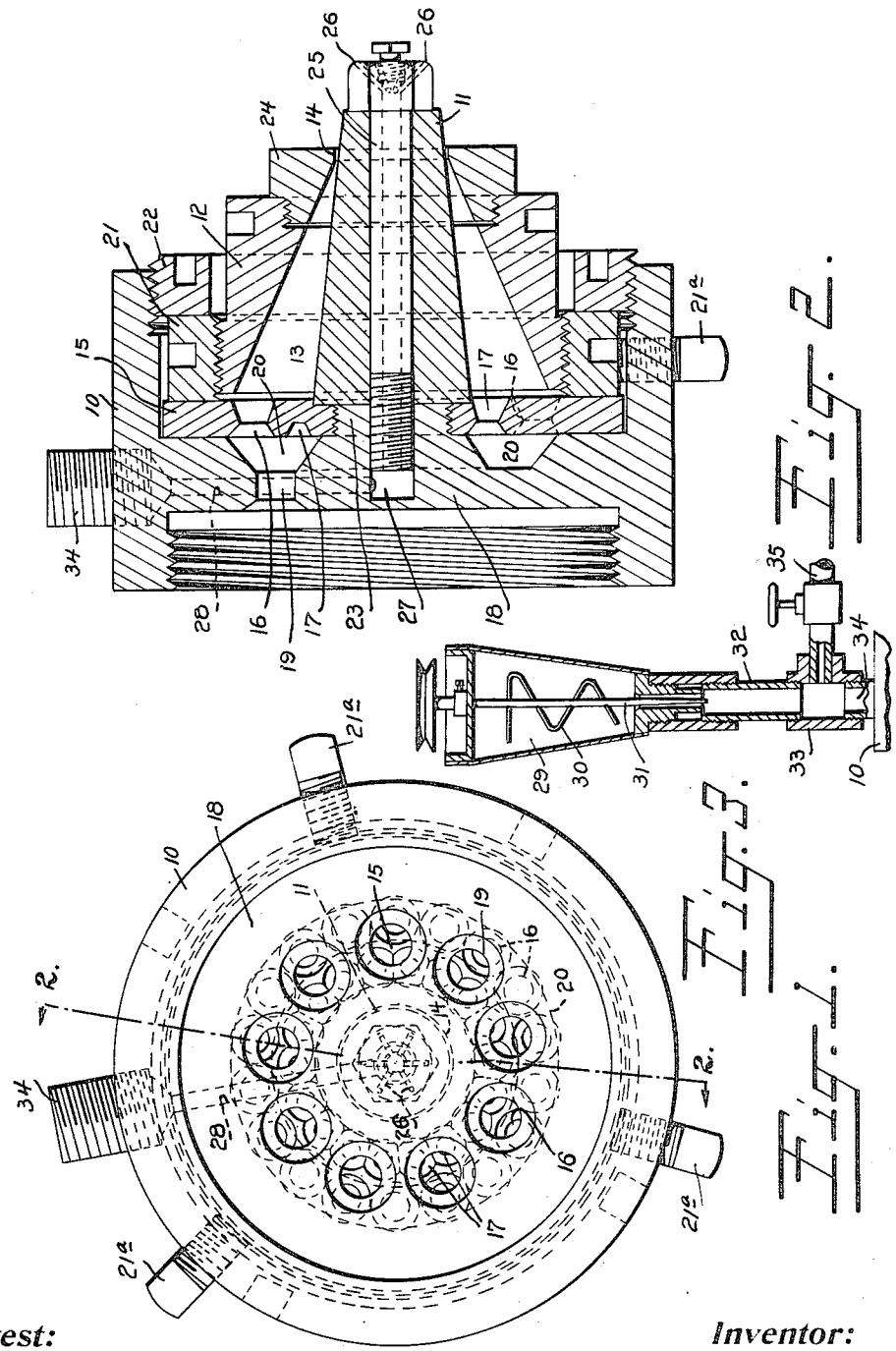

WALTER P. BRADLEY, OF PROVIDENCE, RHODE ISLAND, ASSIGNOR TO REVERE RUBBER COMPANY, A CORPORATION OF RHODE ISLAND.

RUBBER-TUBING MACHINE.

1,289,033.      Specification of Letters Patent.      Patented Dec. 24, 1918.

Application filed September 6, 1917. Serial No. 189,963.

*To all whom it may concern:*

Be it known that I, WALTER P. BRADLEY, a citizen of the United States, residing in Providence, county of Providence, State of Rhode Island, have invented certain new and useful Improvements in Rubber-Tubing Machines, of which the following is a full, clear, and exact description.

My invention relates to rubber-tubing machines and more particularly to the forming die thereof.

In a machine made in accordance with my invention, the die construction is such as to secure not only uniformity in thickness throughout the tubing, but the grain of the rubber will be so laid as to be in substantially straight lines. Means are provided whereby as the rubber enters the die, it will be accummulated in a manner to secure an efficient mixing or amalgamation of the entire mass of rubber, and a more uniform conditioning thereof before it passes about the mandrel. The rubber so accummulated, is forced through a number of closely juxtaposed apertures into a cap forming a chamber about the forming mandrel, the arrangement of these apertures being such as to cause a substantially uniform distribution of the pressures exerted upon the plastic mass in forcing it through this chamber and from the discharge orifice of the die.

Another characteristic of the invention is the adaptability of the die to adjustment so as to secure tubes of different thicknesses without the necessity of dismantling the die.

In addition to the capability of varying the thicknesses of the tubing, I may and preferably do use interchangeable mandrels and caps so that tubes of different dimensions may be produced.

The die is so constructed that, as the rubber tubing leaves the discharge orifice, talc or any other desired medium for preventing adhesion of the inner walls of the tubing, will be projected, or sprayed, within the tube.

The die may be readily taken apart for purposes of cleaning, suitable means being provided to facilitate accuracy in the positioning of the forming cap with relation to its coöperating mandrel.

My invention consists primarily in a tubing machine embodying therein a forming die consisting of a main body, a mandrel supported thereby; a cap inclosing and forming a graduated chamber having a discharge orifice about said mandrel; and a plate adjacent the inner end of said cap, having a plurality of openings arranged in concentric circles directly communicating with said chamber; and in such other novel forms of construction and combination of parts as are hereafter set forth and described, and more particularly pointed out in the claims hereto appended.

Referring to the drawings:

Figure 1 is an end view of a die embodying my invention;

Fig. 2 is a section on the line 2—2 of Fig. 1; and

Fig. 3 is a sectional view of the hopper for the talc or other medium, and its associated parts.

Like numerals refer to like parts throughout the several views.

In the embodiment of my invention shown in the drawings, the body of the die, indicated at 10, is adapted to be positioned adjacent to the discharge end of the tubing machine, so as to have the rubber or rubber composition delivered to the die therethrough. Carried by and projecting substantially axially of the said die body is a mandrel 11. Supported by the body 10, and inclosing the mandrel 11, is a cap 12, the inner wall of said cap and the outer wall of said mandrel converging toward each other in a manner to form a graduated chamber 13. Said cap, at its smallest diameter, is spaced away from the mandrel 11 in a manner to form a discharge orifice 14 between said mandrel and said cap.

Supported within the body 10, adjacent the large end of the chamber 13, is a plate 15 having therein openings 16 and 17 arranged in two concentric circles extending therethrough and communicating with said chamber 13. The openings 16 and the openings 17 are closely juxtaposed with relation to other openings 16 and other openings 17, the openings of each row being staggered in relation to those in the other row in a manner to cause a substantially continuous body of the plastic to be delivered within the chamber 13 about the mandrel 11.

This arrangement of the openings 16 and 17 results not only in a substantially uniform distribution of the pressure forcing the plastic mass toward the orifice 14, but the streams of rubber passing through the openings of one row, will overlie or underlie those passing through the other row, in a manner to secure a more uniform distribution in bulk of the rubber within the chamber 13, and prevent the formation of voids within said chamber which would tend to have the effect of forming longitudinal corrugations in the finished product. Preferably the openings 17 are of less capacity than the openings 16.

The inlet of each of the openings 16 and 17 is outwardly flared, as is the outlet thereof. This constricted part substantially central of each opening, causes the compaction of the plastic as it is forced therethrough, and the expansion thereof, as it enters the chamber 13 in a manner to avoid dead spaces, and form overlapping beads of the plastic.

In order to secure a more effective mixing or amalgamation of the rubber after it leaves the worm of the tubing machine proper, and before it is passed through the openings 16 and 17, I provide the body 10 with a transverse partition 18, having a plurality of openings 19 extending therethrough. The inlet end of each of the openings 19 is outwardly flared, as shown, while the outlet ends thereof are connected with a continuous trough or channel 20 into which the plastic flows and accumulates prior to its passing through the various openings 16 and 17. The walls of this trough or channel diverge so as to be of a width to include the flared inlet of the openings 16 and 17, respectively. By the construction heretofore described, any tendency of the streams of rubber to develop a spiral trend is avoided.

The mandrel 11 is of gradually reduced dimensions toward the orifice 14, so that by a relative change, in the position, or an axial adjustment, of said mandrel and the cap 12, the capacity of the orifice 14 may be varied to control the thickness of the tube formed by forcing the plastic therethrough. As a matter of convenience, I prefer to have the cap 12 adjustable with relation to the mandrel 11, and to permit such adjustment I mount said cap with relation to the body by means of coöperating screw-threads carried thereby, and by an annulus 21 seated within said body 10 and adjacent the plate 15. This annulus is secured in position by means of a nut 22 having screw-threads coöperating with screw-threads within the body 10.

To facilitate the cleaning of the die, I mount the plate 15 upon a screw-threaded boss 23 upon the partition 18.

To permit the removal of the mandrel 11 and the substitution of another mandrel of different dimension, I detachably mount said mandrel within the body 10, and in order to facilitate the substitution of a cap adapted to coöperate with one mandrel for a cap adapted to coöperate with another, without entirely dismantling the die, I provide the cap 12 with a removable tip 24. This construction, however, is a mere matter of convenience and is not essential to the invention.

To facilitate the introduction of talc, or any other desired medium, for preventing the adhesion of the inner walls of the tube when it collapses after leaving the die, I so construct the mandrel that talc or other medium may be projected or sprayed within the tube as it leaves the orifice 14.

In the accompanying drawings, I have illustrated a die capable of producing a tube of fairly large dimension, and in this form of the invention this means comprises a hollow bolt 25 having diverging branch nozzles 26 adjacent the outer end thereof. This bolt in addition to serving as a conduit for the passage of the talc or other similar medium, is also utilized in the form of the invention shown in the drawings, for removably mounting the mandrel in relation to the partition 18. This bolt communicates with a chamber 27 substantially centrally of the partition 18, a conduit 28 passing between the openings 19, discharging into said chamber.

The talc or other medium is conveyed through the duct in the bolt 25 and discharged from the nozzles 26 by a suitable fluid pressure, such as compressed air. Other means for supplying said talc to the duct 28 may be employed, although I preferably use a mechanism such as is shown in Fig. 3 of the drawings. This mechanism comprises a closed hopper 29, having therein an agitator 30 and an anti-choke device 31 carried by the shaft of said agitator and extending into the nozzle of the hopper. Leading from the outlet nozzle of the hopper 29, is a pipe 32 discharging through a fitting 33 into a nipple 34 communicating with the duct 28. Discharging into the fitting 33 is a valve-controlled air-line 35.

As shown in Fig. 1, the body 10, mandrel 11, cap 12, and annulus 21, are circular, although it is not my intention to limit the invention to this particular construction.

In order to secure a uniform thickness throughout the tube, it is necessary to accurately position the cap 12 in relation to the mandrel 11. To permit this adjustment, I provide the body 10 with three adjusting screws 21ª acting upon the annulus 21. These screws are arranged a substantially equal distance apart.

The operation of the device above described, is substantially as follows:

The rubber, or other plastic, as it leaves the tubing machine proper, passes through the various openings 19 and enters the channel 20, wherein it accumulates until a sufficient volume thereof is present to cause subsequent pressure from the incoming plastic to force that previously delivered to the channel 20, through the various openings 16 and 17 into the chamber 13. The openings 19 are spaced well apart, as shown in Fig. 1 of the drawings, so that it is essential to provide the channel 20, or other like chamber, to secure a proper feeding of the plastic through all the openings 16 and 17. While the constricted central portions of succeeding openings 16 or 17, are spaced apart, nevertheless, the staggered arrangement of the openings 16 with relation to the openings 17 is such that the space between the streams passing through the openings 16 will be filled by the streams passing through the openings 17, and vice versa, so that as this mass is advanced in the chamber 13, the converging walls of said chamber will compact, distend, and unite the various streams in a manner to bring them to uniform thickness without voids therein.

Gradually the entire mass will be forced through the discharge orifice 14 in tubular form inclosing the projected end of the mandrel 11. As the tube passes from said mandrel, talc or other equivalent material, will be projected or sprayed upon the inner surface of the tube in sufficient quantity to prevent the adhesion of the walls of the tube as the tube collapses.

The talc, or other medium, may be forced axially through the mandrel under light pressure.

If it be desired to increase the thickness of the tube without varying its outside diameter, it is merely necessary to move the cap 12 and its tip 24 outwardly of the plates 15 by means of the screw-threaded connection between it and the annulus 21. While if it be desired to produce a thinner tube, of the same dimension, said cap may be moved toward the plate 15. The conical character of the mandrel 11 results in the enlargement or contraction of the orifice 14 by this movement of the cap 12. If, however, it is of a form other than circular, other means of adjustment of the cap 12 may be employed.

The arrangement of the plate 15 and the partition 18 permits the openings 19 to be spaced apart sufficiently to afford space for the passage of the duct 28, while permitting the various openings communicating with the chamber 13 to be sufficiently closed juxtaposed to secure the desired density of the plastic in said chamber.

A die made in accordance with my invention is particularly adapted for use in tubing high grade rubbers, used in the production of ordinary rubber bands.

When the band is stretched the rubber is placed under a high tension and if there are any weak points, these will give way under distortion. Bands made according to my invention are formed of a plurality of cylindrical rubber beads each of which overlaps the adjacent bead to a considerable extent, so that when the whole is amalgamated together into a hollow tube the different sections of rubber forming the tube will be strongly secured together by lap-joints of ample magnitude to make a very strong rubber band capable of withstanding the desired stretch.

The partition separating the various openings 16 and 17 of each row, will check any tendency of the plastic to have a spiral trend within the chamber 13, thus causing the mass of plastic in said chamber to advance in a line parallel with the axis of the mandrel and impart a straight grain to the finished product of the machine. After the tubing leaves the machine, it is vulcanized in the usual or in any desired manner.

It is not my intention to limit the invention to the precise details of construction shown in the accompanying drawings, it being apparent that such may be varied without departing from the spirit or scope of the invention.

Having described the invention, what I claim as new and desire to protect by Letters Patent:

1. In a tubing machine, a forming die embodying therein a main body, a mandrel supported thereby, means coöperating with said mandrel to form a converging annular chamber terminating in an annular discharge orifice at its outer end and an annular receiving orifice at its inner end, a wall at the rear of the chamber having an annular trough substantially the width of and registering with the annular receiving orifice and orifices at the rear of and directly communicating with said trough at their forward ends and adapted to directly communicate with the tubing machine at their rear ends, and a wall between the annular trough and annular chamber having a plurality of orifices connecting said annular trough and chamber.

2. In a tubing machine, a forming die embodying therein a main body, a mandrel supported thereby, means coöperating with said mandrel to form a converging annular chamber terminating in an annular discharge orifice at its outer end and an annular receiving orifice at its inner end, a wall at the rear of the chamber having an annular trough substantially the width of and registering with the annular receiving orifice and orifices at the rear of and directly communicating with said trough at their forward ends and adapted to directly communicate with the tubing machine at their rear ends, and a wall between the annular trough and annular chamber having a plurality of orifices arranged in concentric circles connecting said annular trough and chamber.

3. In a tubing machine, a forming die embodying therein a main body, a mandrel supported thereby, means coöperating with said mandrel to form a converging annular chamber terminating in an annular discharge orifice at its outer end and an annular receiving orifice at its inner end, a wall at the rear of the chamber having an annular trough substantially the width of and registering with the annular receiving orifice and orifices at the rear of and directly communicating with said trough at their forward ends and adapted to directly communicate with the tubing machine at their rear ends, and a wall between the annular trough and annular chamber having a plurality of orifices arranged in concentric circles connecting said annular trough and chamber and having their ends flaring outwardly.

4. In a tubing machine, a forming die embodying therein a main body, a mandrel supported thereby, means coöperating with said mandrel to form a converging annular chamber terminating in an annular discharge orifice at its outer end and an annular receiving orifice at its inner end, a wall at the rear of the chamber having an annular trough substantially the width of and registering with the annular receiving orifice and orifices at the rear of and directly communicating with said trough at their forward ends and adapted to directly communicate with the tubing machine at their rear ends, and a wall between the annular trough and annular chamber having a plurality of orifices arranged in concentric circles in staggered relation connecting said annular trough and chamber.

5. In a tubing machine, a forming die embodying therein a main body, a transverse partition therein having a row of openings extending therethrough, the discharge ends of said openings communicating with a continuous channel or trough, a mandrel supported by said partition and having a duct extending axially thereof, said partition having a duct intermediate said openings communicating with said duct through said mandrel, means delivering talc or other antisticking substances to said ducts, means coöperating with said first means whereby air or other suitable fluid under pressure may be circulated through said ducts, a cap inclosing and forming a graduated chamber having a discharge orifice about said mandrel, and a plate adjacent the inner end of said cap, having a plurality of openings arranged in concentric circles in direct communication at their forward ends with said chamber and at their rear ends in communication with said channel or trough.

Signed at Providence, Rhode Island, this 18th day of August, 1917.

WALTER P. BRADLEY.